United States Patent [19]
Matsui

[11] Patent Number: 5,787,064
[45] Date of Patent: Jul. 28, 1998

[54] OPTICAL HEAD WITH A PLURALITY OF OPTICAL SENSORS TO RECEIVE REFLECTED LIGHT BEAMS FOR REPRODUCING FOCUSING, TRACKING AND RF SIGNALS

[75] Inventor: Tsutomu Matsui, Tokyo, Japan

[73] Assignee: NEC Corporation, Tokyo, Japan

[21] Appl. No.: 721,241

[22] Filed: Sep. 26, 1996

[30] Foreign Application Priority Data

Sep. 29, 1995 [JP] Japan ................................. 7-254092

[51] Int. Cl.⁶ ................................................ G11B 7/00
[52] U.S. Cl. .................. 369/112; 369/44.23; 369/44.41; 369/110
[58] Field of Search ................ 369/112, 44.41, 369/44.23, 44.42, 110, 109

[56] References Cited

U.S. PATENT DOCUMENTS

| | | | |
|---|---|---|---|
| 4,951,274 | 8/1990 | Iwanaga et al. | 369/112 |
| 4,993,011 | 2/1991 | Torazawa et al. | 369/112 |
| 5,161,139 | 11/1992 | Inoue et al. | 369/112 |
| 5,559,767 | 9/1996 | Matsui | 369/112 |
| 5,568,457 | 10/1996 | Yang et al. | 369/112 |

FOREIGN PATENT DOCUMENTS 62-145536  6/1987  Japan .

*Primary Examiner*—Tod R. Swann
*Assistant Examiner*—Kim-Kwok Chu
*Attorney, Agent, or Firm*—Sughrue, Mion, Zinn, Macpeak & Seas, PLLC

[57] ABSTRACT

A beam emitted from a beam source is irradiated on an optical disc. A part of the reflected beam from the optical disc is incident on a four-piece prism, while the remaining part of the reflected beam is incident on a second sensor. The reflected beam incident on the four-piece prism is split into four beams outgoing in different directions so that they are incident on the first optical sensor. The first optical sensor is provided with first and second optical sensor elements, and the first optical sensor element that has received two beams of four beams split by the four-piece prism outputs a signal for producing a focus error signal. A plurality of operational amplifiers generate a focus error signal based on the signal output from the first optical sensor element. On the other hand, the second optical sensor element that has received two beams of a plurality of beams divided by the prism outputs a signal for generating an RF signal. An RF head amplifier generates an RF signal based on the signal output from the second optical sensor element.

23 Claims, 12 Drawing Sheets

FIG.12A
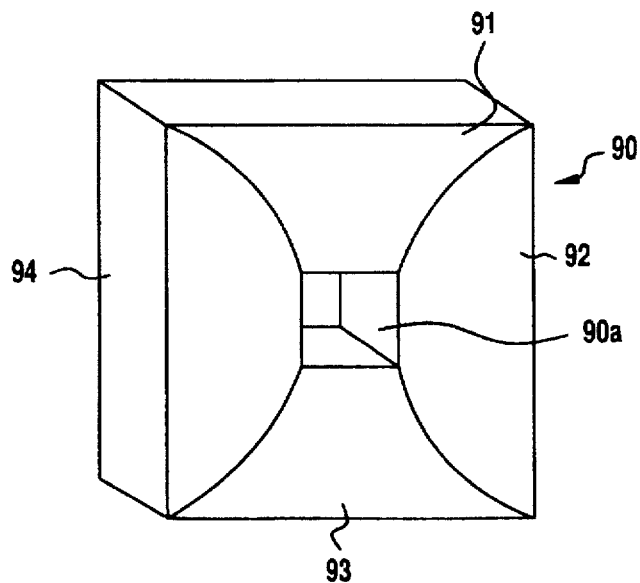
FIG.12B
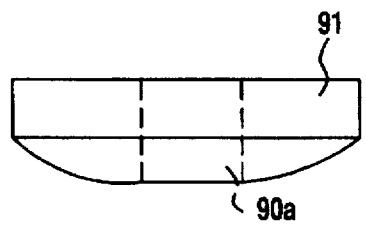
FIG.12C   FIG.12D
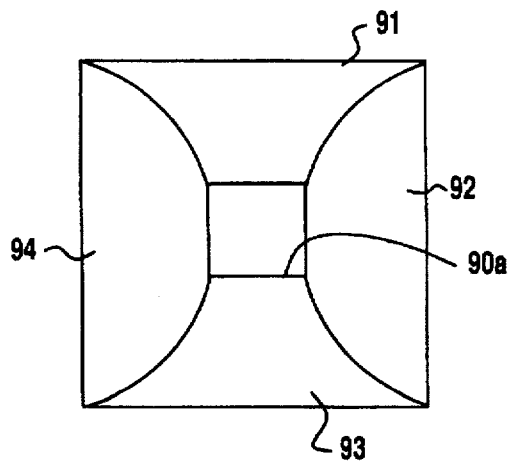 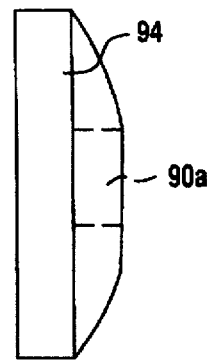

OPTICAL HEAD WITH A PLURALITY OF OPTICAL SENSORS TO RECEIVE REFLECTED LIGHT BEAMS FOR REPRODUCING FOCUSING, TRACKING AND RF SIGNALS

BACKGROUND OF THE INVENTION

1. Field of the Invention

The present invention relates to an optical head apparatus, e.g., an magneto-optical head apparatus or a phase change optical head apparatus, capable of recording information onto an optical disc such as an magneto-optical medium and a phase change medium, reproducing recorded information and/or erasing recorded information, and more particularly to an optical head apparatus capable of reducing a resistance noise voltage of radio frequency (RF) signals.

2. Description of the Related Art

High-speed random access to an optical disc is available, and the optical disc can store a more volume of data compared with a magnetic hard disc. In addition, the optical disc is also superior in life and durability. The optical disc is therefore expected to be widely used as a storage unit of the next generation. In order to bring out the maximum advantages of such an optical disc, improvement of an optical head apparatus for reading information from the optical disc has been greatly carried out.

Here, a conventional optical head apparatus will be described with reference to the drawings.

Referring to FIG. 1, a laser beam emitted from a laser light source 111 passes through a collimator lens 112 to form a parallel light and is incident upon a diffraction grating 113 to be converted into three beams. These three beams are turned into circularly-polarized light by a quarter wave-length plate 115, then focused by an objective lens 116 and are incident upon an optical disc 150. The three beams reflected by the optical disc 150 are further reflected to a convex lens 120 by a polarizing beam splitter 114 to be focused by the convex lens 120. The focused beams are incident upon a six-piece optical sensor 123 through a concave lens 121 and a cylindrical lens 122.

Referring to FIG. 2, the six-piece optical sensor 123 is provided with a four-piece optical sensor element consisting of four optical sensor elements A, B, C and D equally divided by a vertical line and a horizontal line orthogonal thereto, and optical sensor elements E and F provided on both sides of the four-piece optical sensor element. The optical sensor elements A and C are connected to an RF head amplifier 133 through a capacitor 132. The optical sensor elements A and C are also connected with an operational amplifier 134 via a resistance $R_A$ for photoelectric conversion. On the other hand, the optical sensor elements B and D are connected with the RF head amplifier 133 through a capacitor 131. The optical sensor elements B and D are also connected with an operational amplifier 135 through a resistance $R_B$ for photoelectric conversion. Outputs from the operational amplifiers 134 and 135 are input to an operational amplifier 136.

The optical sensor elements E and F are connected with differential amplifiers 137 and 138, respectively.

Amplification of each output signal from the four-piece optical sensor elements A through D by the RF amplifier 133 produces a reproduction signal for the optical disc 150. The operational amplifiers 134, 135 and 136 receive output signals from the four-piece optical sensor elements A to D to generate a focus error signal [(A+C)−(B+D)]. Here, in the expression [(A+C)−(B+D)] representing the focus error signal output from the operational amplifier 136, each of A to D corresponds with each output signal from the optical sensor elements A to D. A focus error is detected based on the generated focus error signal.

Further, the differential amplifiers 137 and 138 produce tracking error signals $T_A$ and $T_B$ by amplifying each output signal from the optical sensor elements E and F. A tracking error is detected based on the thus-generated tracking error signals $T_A$ and $T_B$.

In such a conventional optical head apparatus, output signals of the four-piece optical sensor elements A to D are used in order to produce both the focus error signal and the RF signal. The RF signal are therefore affected by the resistance noise voltages of the resistance $R_A$ for photoelectric conversion and a feedback resistance $R_B$ and a thermal noise thereof, thereby deteriorating a carrier to noise ratio (CNR) of the RF signal.

In other words, when the beam reflected from the optical disc 150 is subjected to photoelectric conversion, a resistance noise voltage $E_n$ represented by the following expression (1) must be taken into consideration:

$$E_n = 2 \times (4kTBR)^{1/2} \qquad (1)$$

where k: Boltzman's constant=$1.38 \times 10^{-23}$ (Joule/Kelvin)

T: absolute temperature (Kelvin)

B: frequency bandwidth (Hertz)

R: resistance (Ohm)

Referring to the expression (1), the resistance noise voltage $E_n$ affecting the RF signal becomes large as a number of resistances R connected to circuits for generating the RF signals increases, and deterioration of CNR of the RF signal hence becomes prominent.

Thus, in the conventional optical head apparatus, since the resistance noise voltage $E_n$ is not taken into consideration, the linear density and the recording density of the optical disc can not be increased, and an improvement of the recording rate is impossible. The conventional optical head apparatus can not fully demonstrate merits of the optical disc.

Another conventional optical head apparatus is disclosed in Japanese patent laid-open publication No. 62-145536.

Referring to FIG. 3, an optical system of a one-beam type phase change optical head apparatus is shown. Although an optical path extending from the laser beam source 111 to the optical disc 150 is basically similar to that of the above-mentioned optical system shown in FIG. 1, a laser beam emitted from the laser beam source 111 remains as one beam because this optical system is not provided with a diffraction grating.

In this conventional optical head apparatus, a return beam from the optical disc 150 is polarized at an angle of 90° by the polarizing beam splitter 114 and incident upon a first half mirror 142 through the convex lens 141. The first half mirror 142 splits the return beam incident thereon into a beam for generating the RF signal and another beams for generating a servo signal.

The beam for generating the RF signal obtained by being split by the first half mirror 142 is incident on a first optical sensor 143 where the RF signal is produced.

Meanwhile, the beam for generating the servo signal obtained by being split by the first half mirror 142 is further divided into two beams by a second half mirror 144. The beam polarized at an angle of 90° by the second half mirror 144 is incident on a second optical sensor 145 to produce a focus error signal $F_E$. The beam transmitted through the second half mirror 144 is incident on a third optical sensor 146 where a tracking error signal $T_E$ is produced.

Since this conventional optical head apparatus use the two half mirrors 142 and 144 to split the return beam from the optical disc 150 into a beam for generating the RF signal and another beams for generating the servo signal, the beam paths become disadvantageously complicated, which leads to increase in size and complication of the apparatus.

SUMMARY OF THE INVENTION

It is an object of the present invention to provide an optical head apparatus capable of eliminating affection of a resistance noise voltage and preventing the CNR of an RF signal from deteriorating.

Another object of the present invention is to provide a compact optical head apparatus having simple beam paths.

To achieve these and other objects, the present invention provides an optical head apparatus for generating an RF signal, a focus error signal and a tracking error signal based on a beam reflected from an optical disc, the optical head apparatus comprising: a beam splitting means for splitting the reflected beam into at least four beams; a first optical sensor that receives two beams of a plurality of the beams split by the beam splitting means and outputs a signal for generating the focus error signal; and a second optical sensor that receives at least one beam of a plurality of the beams split by the beam splitting means and outputs a signal for generating the RF signal.

BRIEF DESCRIPTION OF THE DRAWINGS

The above and other objects, features and advantages of the present invention will become more apparent from the following detailed description taken with the accompanying drawings in which:

FIG. 12A is a perspective view showing a four-piece prism in a further embodiment according to the present invention;

FIG. 12B is a plan view showing a four-piece prism in the further embodiment according to the present invention;

FIG. 12C is a front view showing a four-piece prism in the further embodiment according to the present invention; and FIG. 12D is a side view showing a four-piece prism in the further embodiment according to the present invention.

DETAILED DESCRIPTION

An optical head apparatus according to a first embodiment of the present invention will now be described in detail with reference to the accompanying drawings.

The optical head apparatus according to this embodiment is a one-beam type phase change optical head apparatus which splits a reflected beam from an optical disc into four beams by a four-piece prism to be incident on an optical sensor element for generating a focus error signal and an optical sensor element for generating an RF signal that are provided independently.

Figure 1:
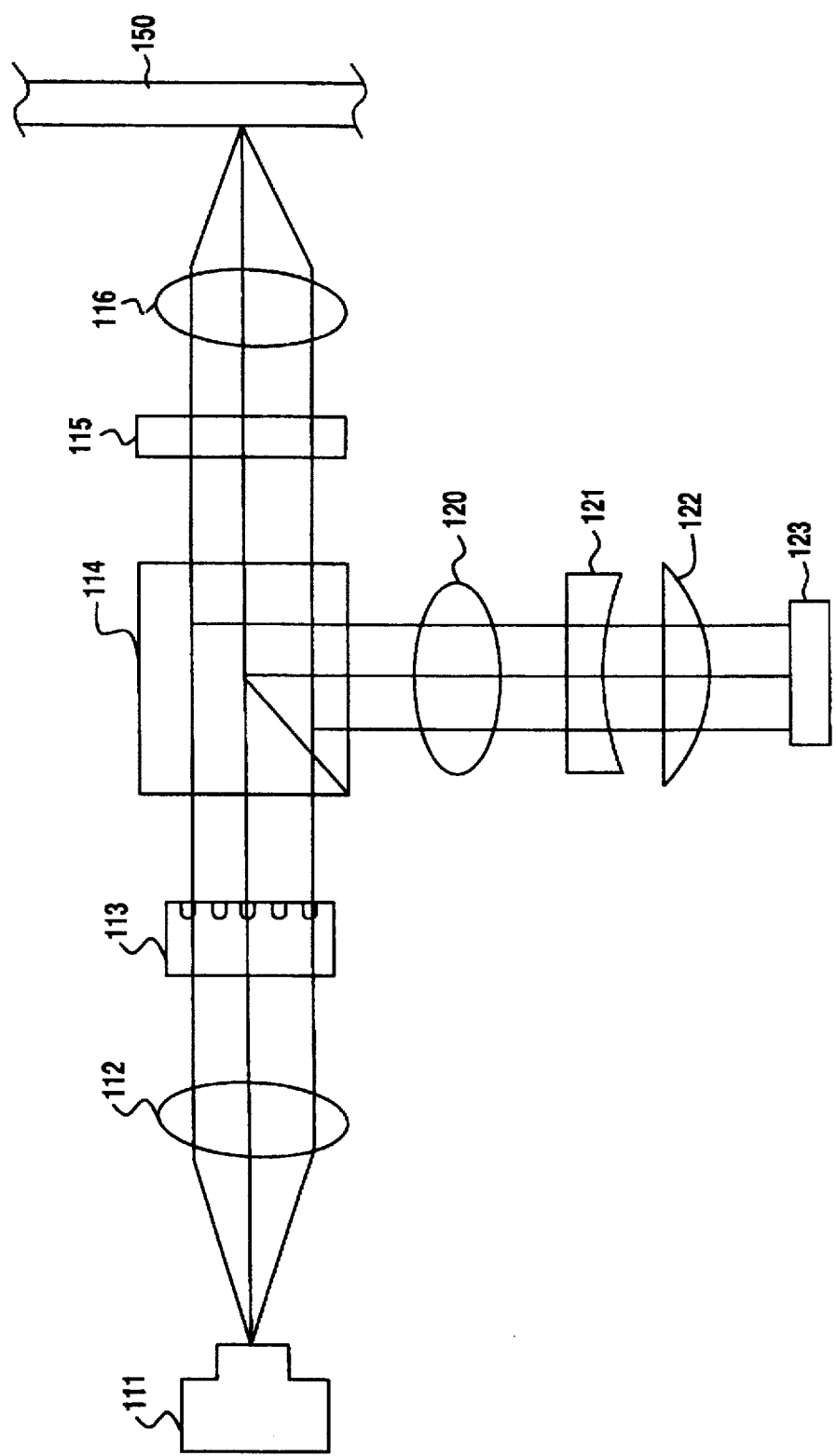
FIG. 1 is a view showing a conventional optical head apparatus.
Figure 2:
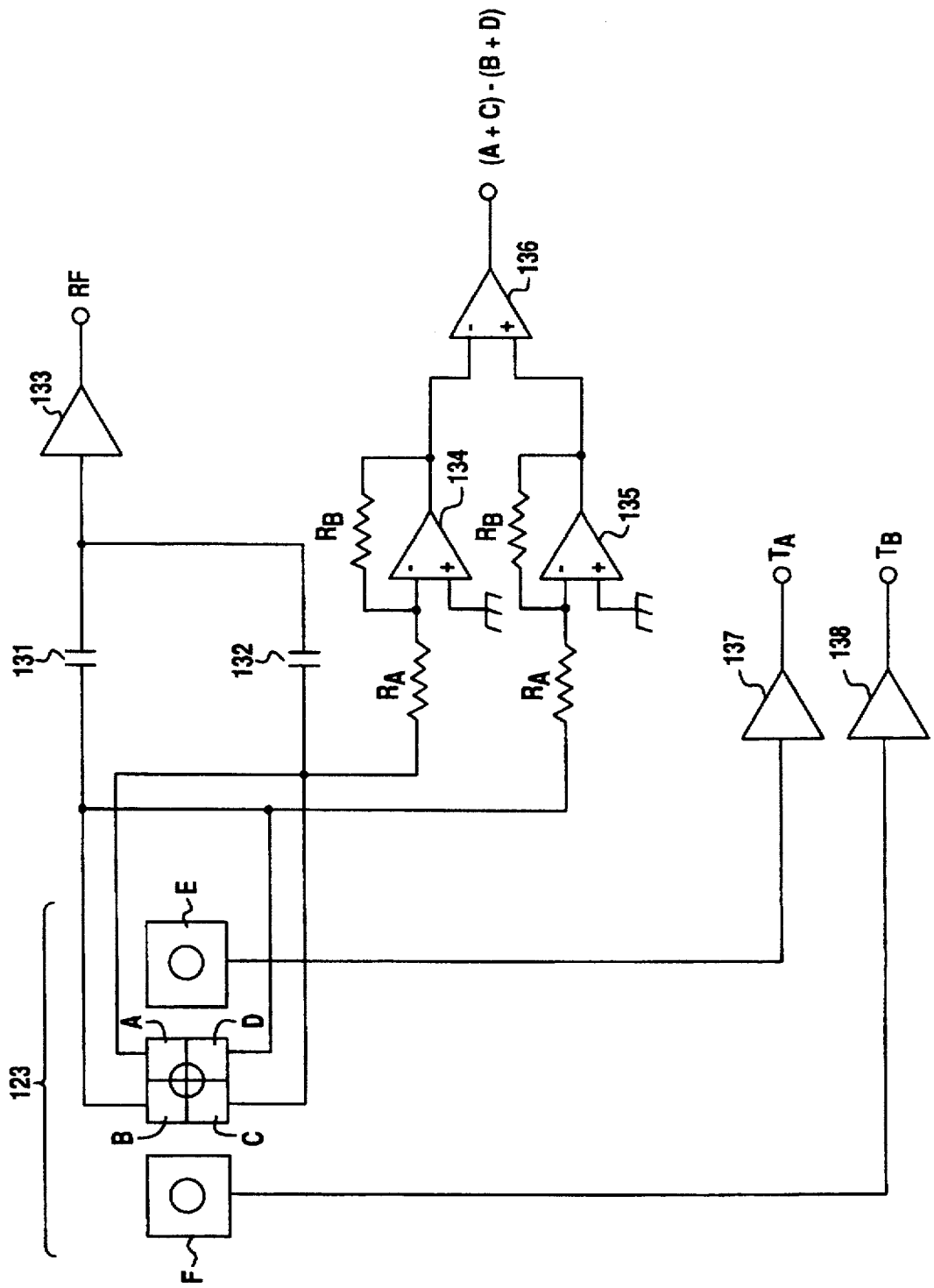
FIG. 2 is a view showing a peripheral circuit of a six-piece optical sensor in the conventional optical head apparatus illustrated in FIG. 1.
Figure 3:
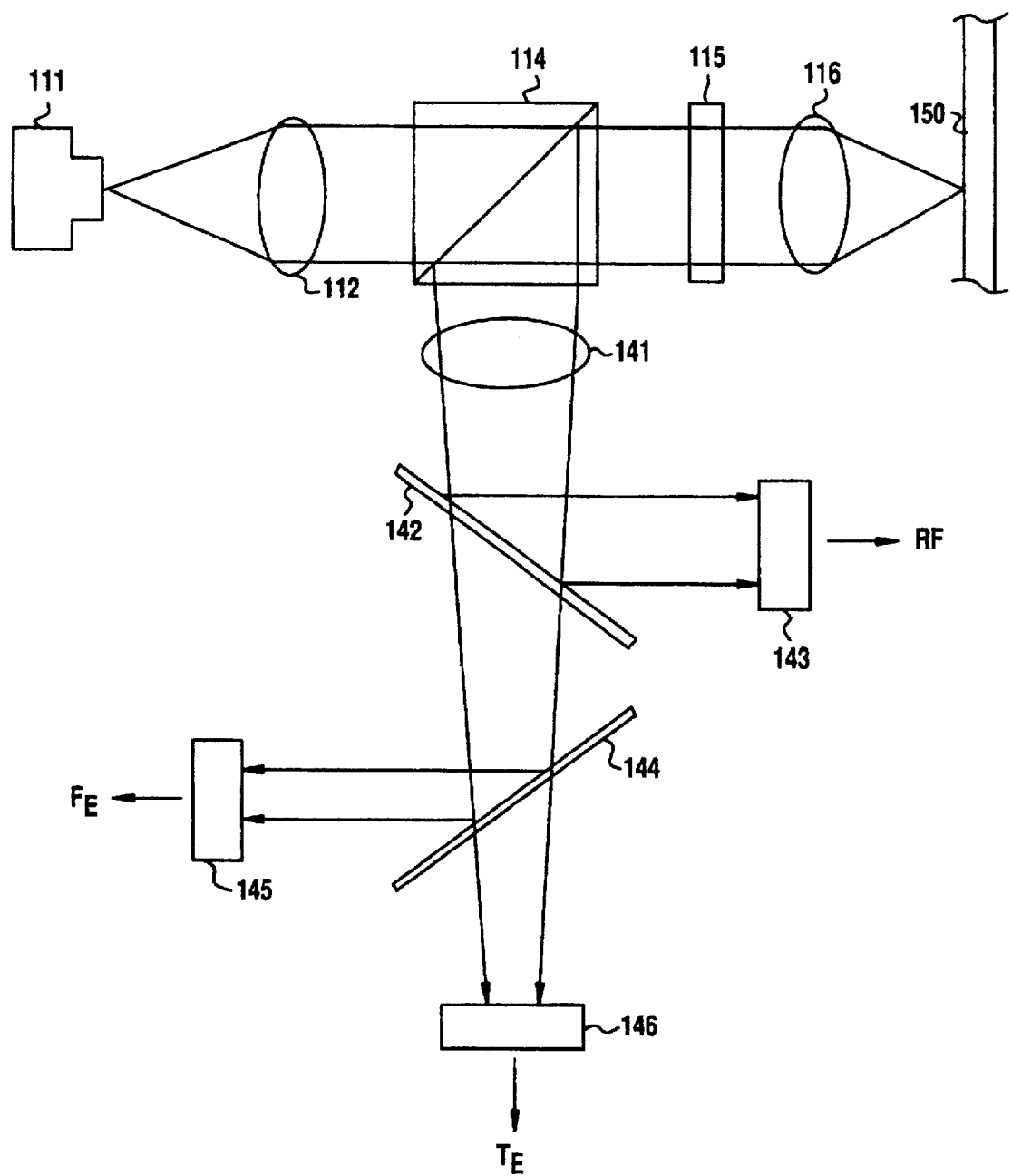
FIG. 3 is a view showing another conventional optical head apparatus.
Figure 4:
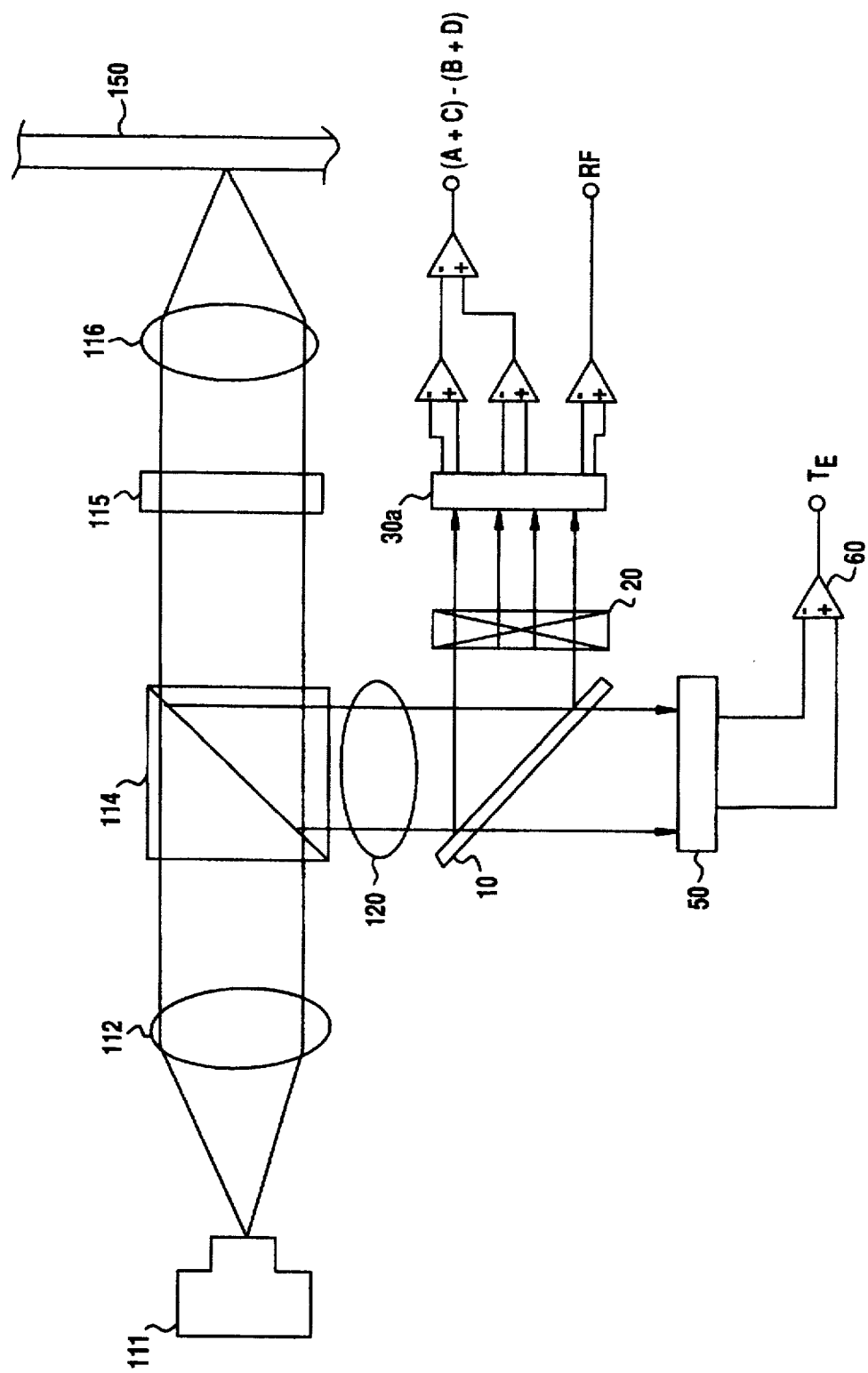
FIG. 4 is a view showing an optical head apparatus of a first embodiment according to the present invention.
Figure 5B:
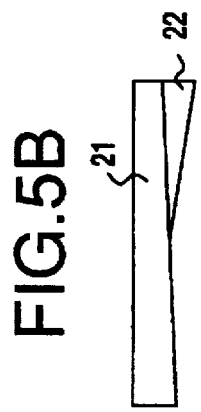
FIG. 5B is a plan view showing a four-piece prism illustrated in FIG. 4.
Figure 5D:
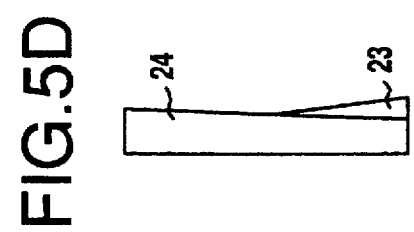
FIG. 5D is a side view showing a four-piece prism illustrated in FIG. 4.
Figure 5A:
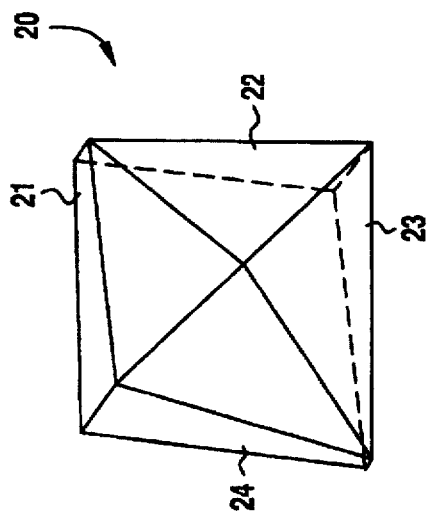
FIG. 5A is a perspective view showing a four-piece prism illustrated in FIG. 4.
Figure 5C:
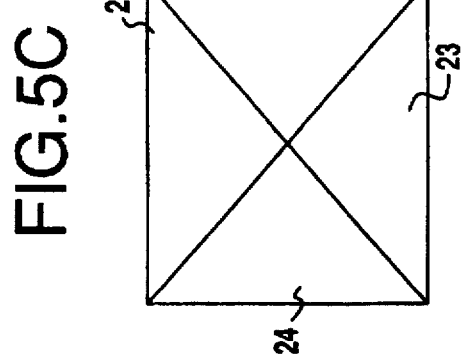
FIG. 5C is a front view showing a four-piece prism illustrated in FIG. 4.

Referring to FIG. 4, a laser beam emitted from a laser beam source 111 passes through a collimator lens 112 to form a parallel beam and is circularly polarized by a quarter wavelength plate 115. The beam is then focused by an objective lens 116 to be incident on an optical disc 150. The reflected beam from the optical disc 150 is reflected to a convex lens 120 by a polarizing beam splitter 114 and focused by the convex lens 120. The reflected beam focused by the convex lens 120 is incident on a half mirror 10. The half mirror 10 reflects a part of the reflected beam to be polarized at 90° and transmits the remaining part of the reflected beam. The reflected beam polarized at 90° by the half mirror 10 is incident on a four-piece prism 20.

Referring to FIGS. 5A to 5D, the four-piece prism 20 is made up of four wedge prism pieces 21, 22, 23 and 24 that are connected in vertical and horizontal directions. The four-piece prism 20 splits the reflected beam from the half mirror 10 into four beams using each of the prism pieces 21, 22, 23 and 24 so that the respective beams are emitted in different directions.

Figure 6:
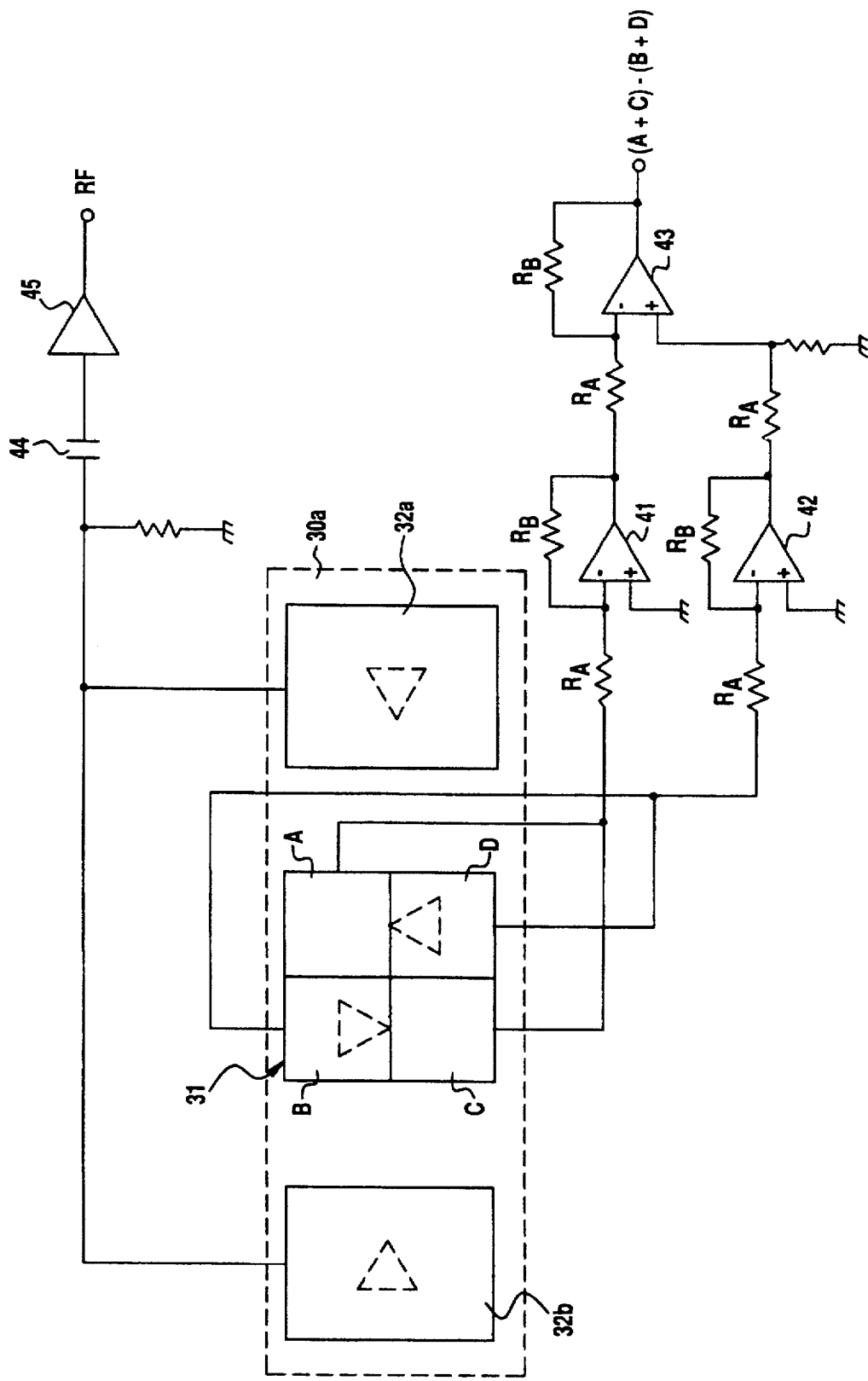
FIG. 6 is a view showing a peripheral circuit of a first optical sensor illustrated in FIG. 4.

The four beams split by the four-piece prism 20 are incident on a first optical sensor 30a as shown in FIG. 4. Referring to FIG. 6, the first optical sensor 30a is provided with an optical sensor element 31 for generating a focus error signal and optical sensor elements 32a and 32b that are arranged on both sides of the element 31 to generate an RF signal.

The optical sensor element 31 is divided into four optical sensor elements A, B, C and D by a vertical line and a horizontal line orthogonal thereto. The four optical sensor elements A to D receive two beams obtained by being split by the prism pieces 21 and 23 disposed on upper and lower portions of the four-piece prism 20, and subject the received beams to photoelectric conversion to output them as electric signals. The signals output from the optical sensor elements A to D are amplified by operational amplifiers 41 to 43 to generate a focus error signal represented by the expression [(A+C)−(B+D)]. In the expression [(A+C)−(B+D)] representing the focus error signal, each of A to D corresponds with each output signal from the optical sensor elements A to D.

In this embodiment, the focus error signal is generated in accordance with a double knife edge method.

Figure 7:
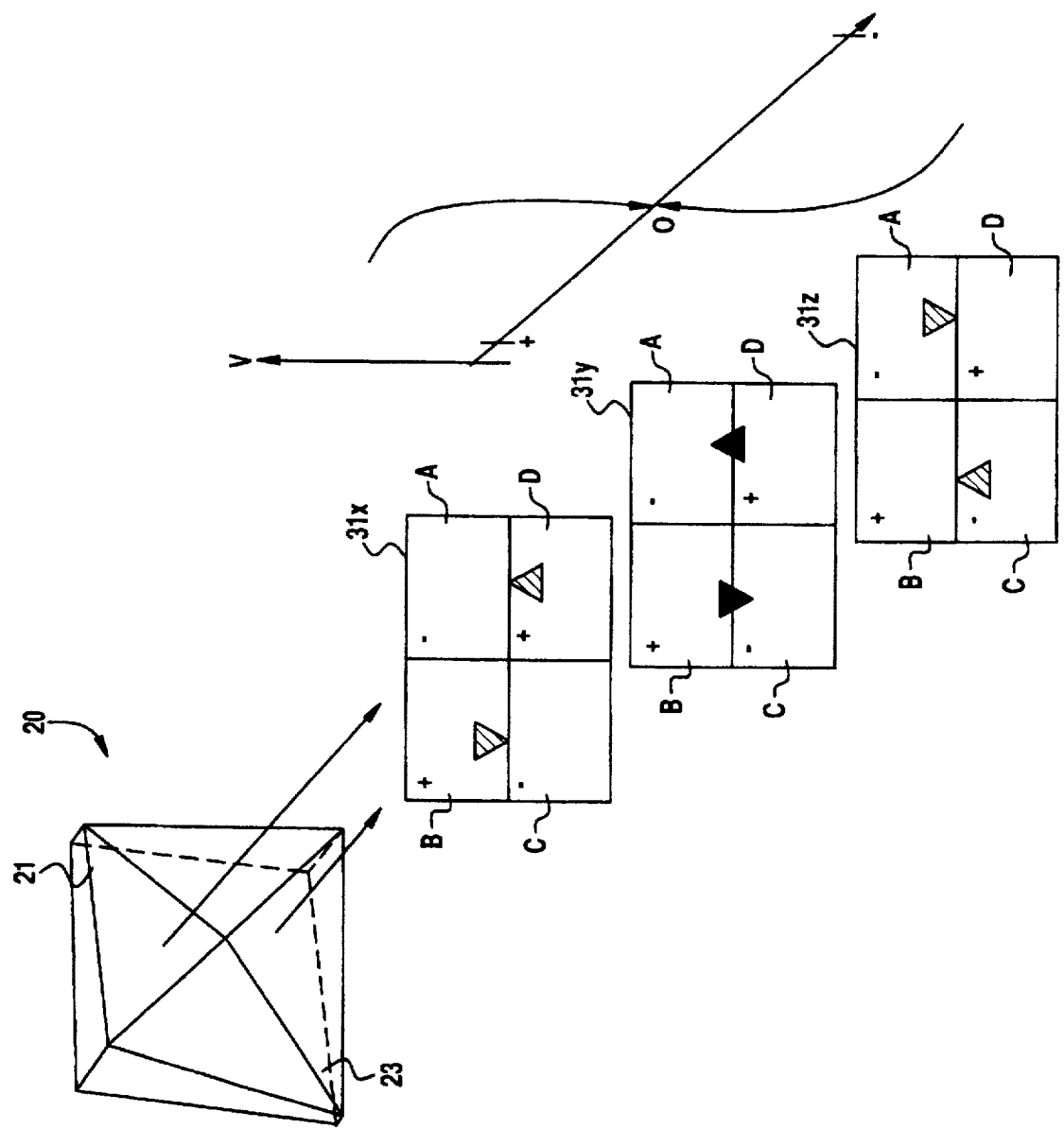
FIG. 7 is a view showing an image forming position for a beam on the optical sensor element that varies in accordance with a change in a distance between an objective lens to an optical disc, and more particularly, a view used for explaining a method for generating a focus error signal.

Referring to FIG. 7, positions at which the beams emitted from the prism pieces 21 and 23 form images on the optical sensor element 31 vary in accordance with a distance between the objective lens 116 and the optical disc 150, as shown on the optical sensor elements 31X, 31Y and 31Z.

When a distance from the objective lens 116 to the optical disc 150 has an appropriate value, the beams emitted from the prism pieces 21 and 23 form images on boundaries between the optical sensor elements A and D and between the optical sensor elements B and C, as shown on the optical sensor element 31Y. Thus, a focus error is not detected.

Meanwhile, when a distance from the objective lens 116 to the optical disc 150 is small, the beams emitted from the prism pieces 21 and 23 form images on the optical sensor elements B and D, as shown on the optical sensor element 31X. The focus error is thus detected based on the focus error signal [(A+C)−(B+D)].

In addition, when a distance from the objective lens 116 to the optical disc is long, the beams emitted from the prism pieces 21 and 23 form images on the optical sensor elements A and C, as shown on the optical sensor element 31Z. The focus error is consequently detected based on the focus error signal [(A+C)−(B+D)].

Returning and referring to FIG. 6, the second optical sensor elements 32a and 32b for generating the RF signal receive two beams split by the prism pieces 22 and 24 disposed on both sides of the four-piece prism 20, respectively, and subject the received beams to photoelectric conversion so that these beams are output as electric signals. The signals output from the respective optical sensor elements 32a and 32b are synthesized and then amplified by an RF head amplifier 45 through a capacitor 44 to generate an RF signal.

Again referring to FIG. 4, the reflected beam transmitted through the half mirror 10 is incident on a second optical sensor 50. The signal subjected to photoelectric conversion by the second optical sensor 50 is amplified by a differential amplifier 60 to generate a tracking error signal $T_E$. Note that, in this embodiment, the tracking error signal $T_E$ is generated utilizing a well-known push-pull method.

As described above, since the four-piece prism 20 splits the reflected beam from the optical disc 150 into four beams so that the optical sensor element 31 for generating a focus error signal receives two beams of the four beams and the optical sensor elements 32a and 32b for generating an RF signal receive the other beams, the circuit for generating the focus error signal and the circuit for generating the RF signal can be separately designed and arranged. Accordingly, a number of resistances connected to the circuit for generating the RF signal can be reduced. As a result, the resistance noise voltage $E_n$ that affects the generated RF signal can be greatly decreased.

In addition, since the focus error signal and the RF signal are produced by the first optical sensor 30a and the tracking error signal is produced by the second optical sensor 50, it is enough for the entire apparatus to provide only two optical sensors. The beam paths can be, therefore, made simple and size and weight of the apparatus can be reduced.

An optical head apparatus according to a second embodiment of the present invention will now be described in connection with the drawings.

The optical head apparatus according to the second embodiment has a configuration that is substantially the same with that of the above-mentioned optical head apparatus according to the first embodiment, but the optical sensor element which forms the first optical sensor for generating the focus error signal and the RF signal is different from that according to the first embodiment.

Figure 8:
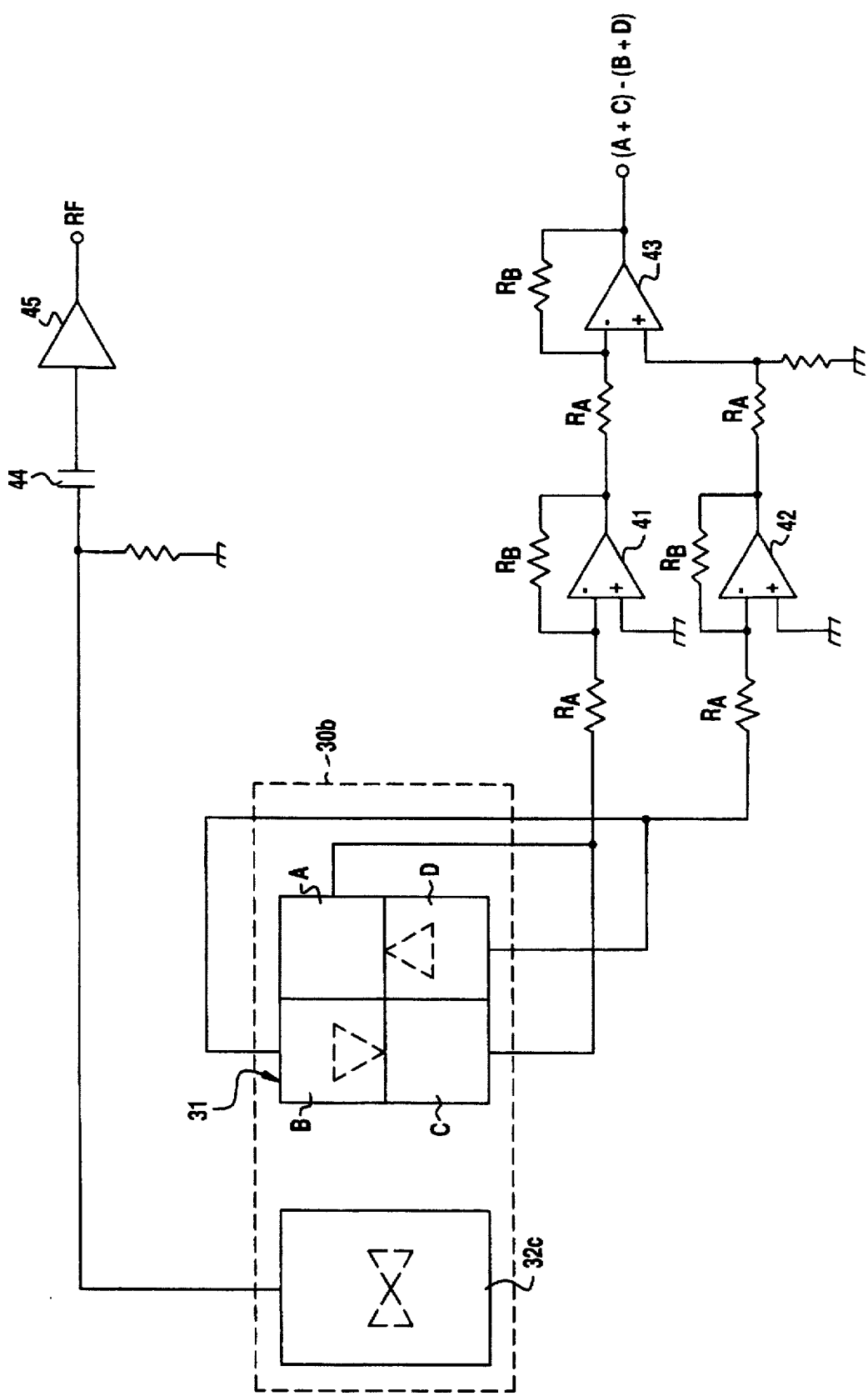
FIG. 8 is a circuit diagram showing a peripheral circuit of the optical sensor that receives beams from a four-piece prism in an optical head apparatus of a second embodiment according to the present invention.

Referring to FIG. 8, a first optical sensor 30b is provided with an optical sensor element 31 that is constituted by four optical sensor elements A to D to generate a focus error signal and an optical sensor element 32c disposed on one side of the optical sensor element 31 to generate the RF signal. That is, in this embodiment, the optical sensor element for producing the RF signal is constituted by the single optical sensor element 32c. Note that, in this embodiment, emission angles at which beams are emitted from prism pieces 22 and 24 positioned on both sides of the four-piece prism 20 such as shown in FIG. 5 are changed from those in the first embodiment, in order to provide the optical sensor elements 31 and 32c as described above.

According to the optical head apparatus of the second embodiment, since only one sensor element for generating the RF signal is provided, the configuration of the peripheral circuit of the optical sensor can be simplified, and the structure of the apparatus can be also simplified and minimized.

An optical head apparatus according to the third embodiment of the present invention will now be described in connection with the drawings.

Figure 9:
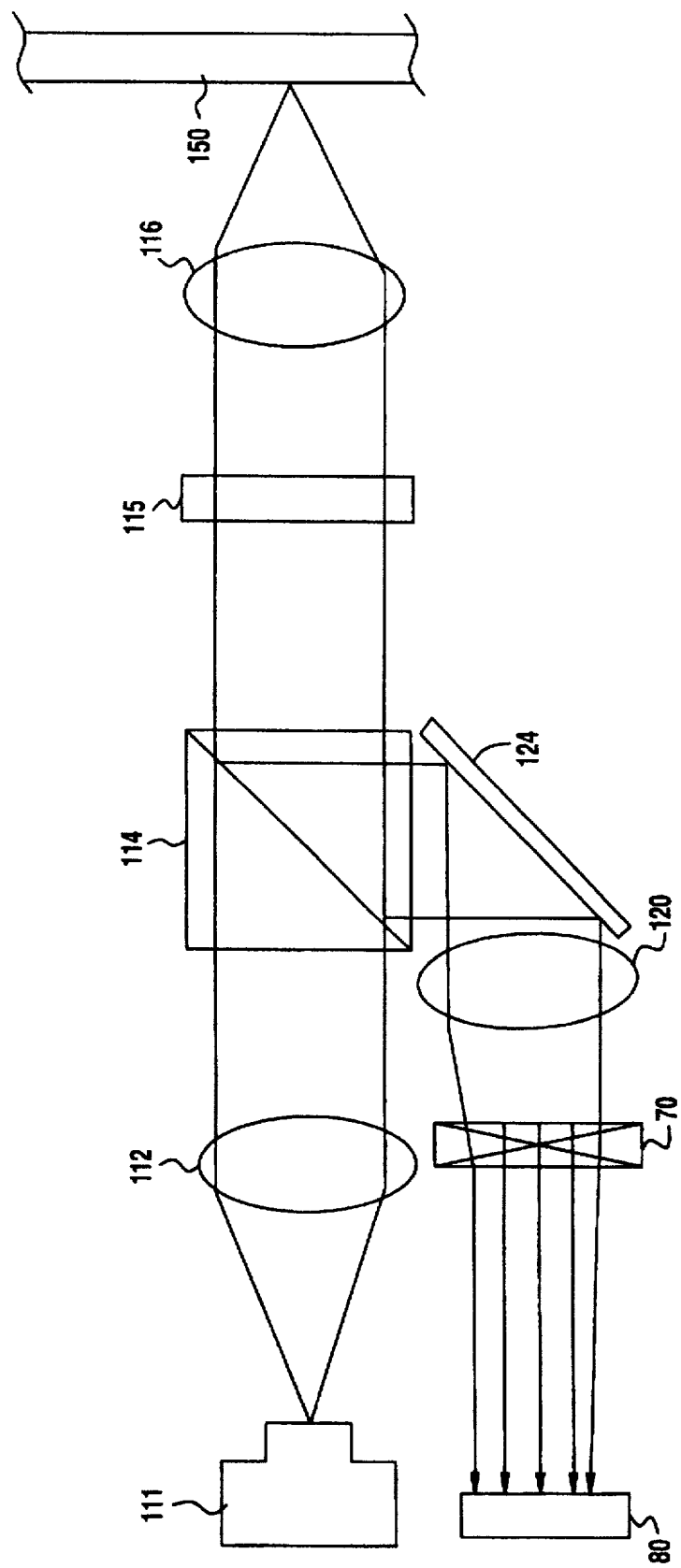
FIG. 9 is a view showing an optical head apparatus of a third embodiment according to the present invention.
Figure 10A:
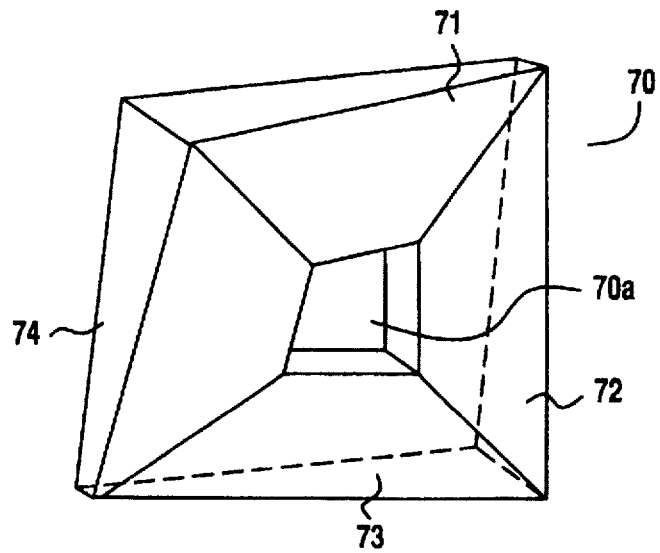
FIG. 10A is a perspective view showing a four-piece prism illustrated in FIG. 9.
Figure 10B:
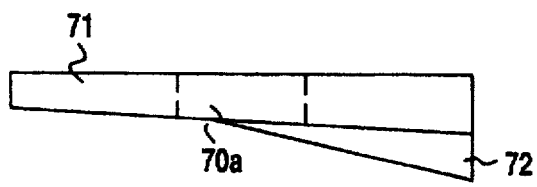
FIG. 10B is a plan view showing a four-piece prism illustrated in FIG. 9.
Figure 10C:
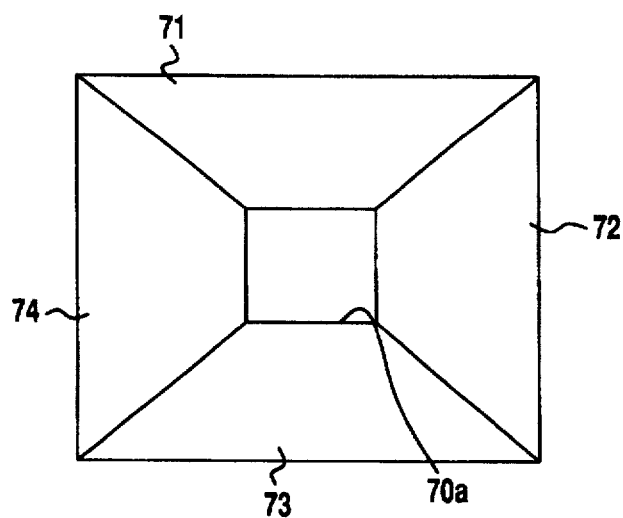
FIG. 10C is a front view showing a four-piece prism illustrated in FIG. 9.
Figure 10D:
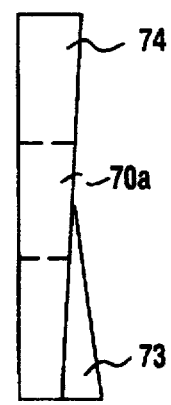
FIG. 10D is a side view showing a four-piece prism illustrated in FIG. 9.

Referring to FIG. 9, a laser beam emitted from the laser beam source 111 passes through the collimator lens 112 to form a parallel beam and is circularly polarized by the quarter wavelength plate 115. The beam is thereafter focused by the objective lens 116 to be incident on the optical disc 150. The reflected beam reflected by the optical disc 150 is polarized at 90° by both the quarter wavelength plate 115 and the polarizing beam splitter 114 and incident on a four-piece prism 70 through a reflecting mirror 124 and a convex lens 120. The beam incident on the four-piece prism 70 is split into a plurality of beams and is incident on an optical sensor 80.

Referring to FIGS. 10A to 10D, four wedge prism pieces 71, 72, 73 and 74 are vertically and horizontally connected with each other to form the four-piece prism 70. The four-piece prism 70 has an opening 70a in the center thereof. The four-piece prism 70 splits the reflected beam from the optical disc 150 into four beams by each of the prism pieces 71 to 74 so that the respective beams are emitted in different directions and transmits a part of the reflected beam from an opening 70a. The four-piece prism 70 can, therefore, split the reflected beam incident thereon into five beams.

Figure 11:
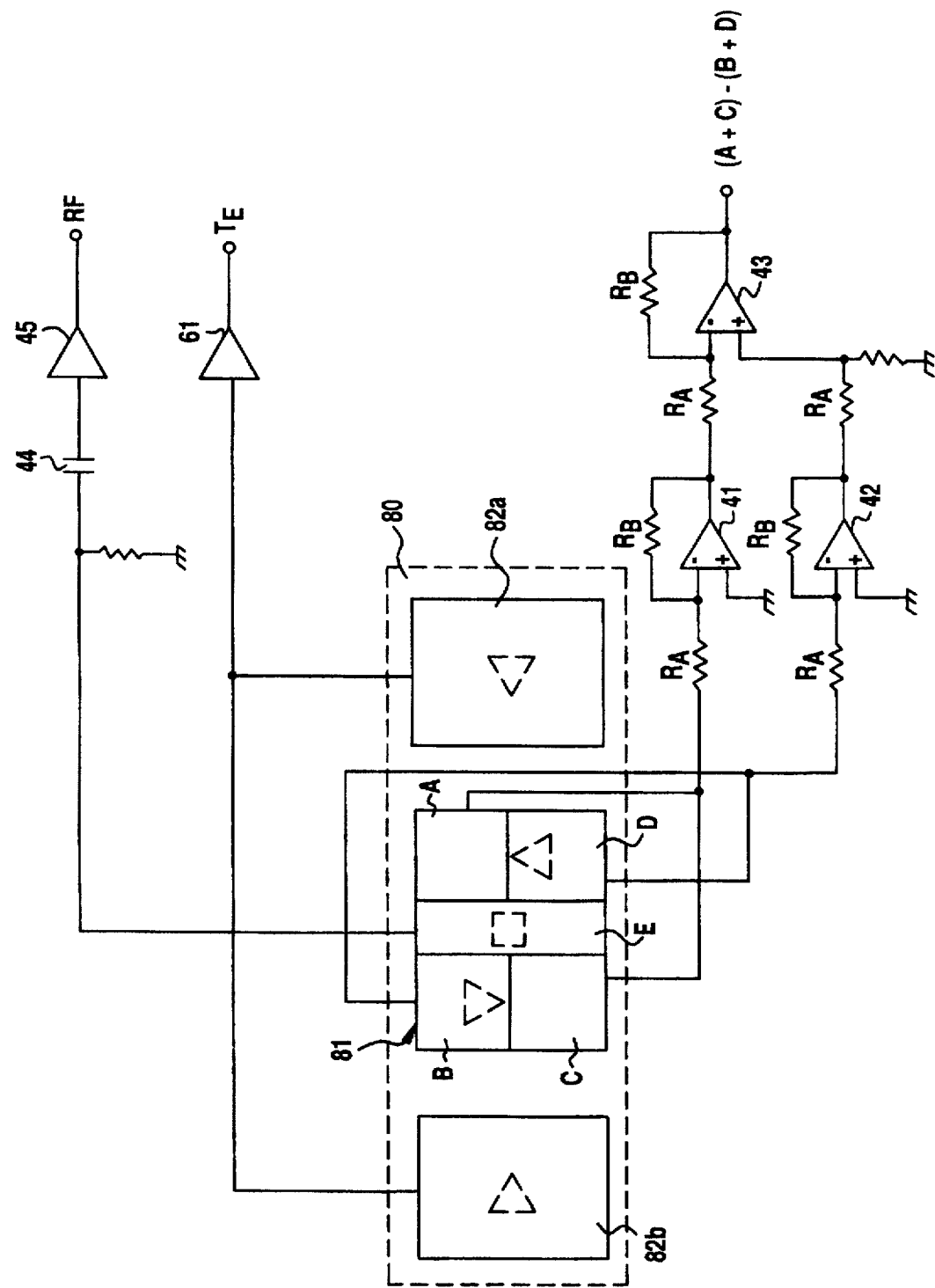
FIG. 11 is a view showing a peripheral circuit of the optical sensor illustrated in FIG. 9.

Referring to FIG. 11, the optical sensor 80 on which a plurality of beams obtained by the four-piece prism 70 are incident is provided with a five-piece optical sensor element 81 and optical sensor elements 82a and 82b for generating the tracking error signal. The five-piece optical sensor element 81 includes optical sensor elements A, B, C and D for producing the focus error signal and an optical sensor element E that is disposed in the middle of these elements A to D to generate the RF signal.

The optical sensor elements A to D receive two beams split by prism pieces 71 and 73 disposed on upper and lower sides of the four-piece prism 70 and output signals. These output signals are amplified by operational amplifiers 41, 42 and 43 to produce a focus error signal [(A+C)-(B+D)].

The optical sensor element E receives a part of the reflected beam transmitted through the opening 70a of the four-piece prism 70 and outputs an signal. This signal is amplified by the RF head amplifier 45 to produce an RF signal.

Further, the optical sensor elements 82a and 82b receive two beams split by prism pieces 72 and 74 disposed on right and left sides of the four-piece prism 70 and output signals. These signals are amplified by a differential amplifier 61 to produce a tracking error signal $T_E$.

According to the optical head apparatus of the third embodiment, the circuit for generating the focus error signal and the circuit for producing the RF signal can be separately configured, and the resistance noise voltage $E_n$ affecting the produced RF signal can be hence greatly reduced.

In addition, since the four-piece prism 70 can split the reflected beam from the optical disc 150 in accordance with the optical sensor elements A to D for producing the focus error signal, the optical sensor element E for generating the RF signal and optical sensor elements 82a and 82b for generating the tracking error signal, it is enough to prepare only one necessary optical sensor. Thus, the beam paths can be further simplified, and simplification of the structure and reduction in size and weight of the apparatus can be realized.

Note that the optical head apparatus according to the present invention is not restricted to the above-mentioned embodiments.

For example, the four-piece prism is not limited to a combination of four wedge prism pieces, and a four-piece prism 90 formed by connecting four prism pieces 91 to 94 each having hyperboloid may be adopted as shown in FIGS. 12A to 12D. Incidentally, the four-piece prism 90 also has an opening 90a in the center thereof.

Moreover, the present invention is not restricted to the one-beam type phase change optical head such as described in the above embodiments, and it can be applied to the optical magnetic head apparatus.

What is claimed is:

1. A phase-change type optical head apparatus, for generating an RF signal, a focus error signal and a tracking error signal based on a reflected beam from an optical disc, comprising:

a beam splitting means for splitting a beam reflected from an optical disc into at least four beams without polarization change;

a first optical sensor that receives two beams of a plurality of the beams split by said beam splitting means and outputs a signal for generating a focus error signal; and a second optical sensor that receives at least one beam of a plurality of the beams split by said beam splitting means and outputs a signal for generating a RF signal by amplifying the outputted signal corresponding to said at least one beam.

2. An optical head apparatus as claimed in claim 1, wherein said second optical sensor is formed by two optical sensor elements provided on both sides of said first optical sensor.

3. An optical head apparatus as claimed in claim 1, wherein said beam splitting means is an optical member for splitting the reflected beam into four beams so that the respective split beams are emitted in different directions.

4. An optical head apparatus as claimed in claim 1, wherein said second optical sensor is formed by one optical sensor element provided in the vicinity of said first optical sensor.

5. An optical head apparatus comprising:

a light source;

an optical member for irradiating a beam emitted from said light source onto an optical disc;

a beam splitter for polarizing a reflected beam from said optical disc;

a half mirror for reflecting a part of the reflected beam polarized by said beam splitter and transmitting the remaining part of the reflected beam;

a prism for splitting the reflected beam reflected by said half mirror into a plurality of beams;

a first optical sensor for receiving two beams of a plurality of the beams split by said prism to output a first signal for generating a focus error signal;

a plurality of operational amplifiers for generating a focus error signal based on the first signal output from said first optical sensor;

a second optical sensor for receiving two beams of a plurality of beams split by said prism to output a second signal for generating an RF signal;

an amplifier for generating an RF signal based on the second signal output from said second optical sensor;

a third optical sensor for receiving the reflected beam transmitted by said half mirror to output a third signal for generating a tracking error signal; and a differential amplifier for generating a tracking error signal based on the third signal output from said third optical sensor.

6. An optical head apparatus as claimed in claim 5, wherein said prism is formed by four prism pieces vertically and horizontally connected with each other, splits the reflected beam reflected by said half mirror into four beams by each prism piece and emits the respective beams in different directions;

said first optical sensor is formed by four optical sensor elements divided by a vertical line and a horizontal line orthogonal thereto, receives two beams obtained by splitting the reflected beam by two prism pieces provided on upper and lower sides of said prism; and said second optical sensor is formed by at least one optical sensor element provided in the vicinity of said first optical sensor element, receives two beams obtained by splitting the reflected beam by two prism pieces provided on right and left sides of said prism.

7. An optical head apparatus, for generating an RF signal, a focus error signal and a tracking error signal based on a reflected beam from an optical disc, comprising:

a beam splitting means for splitting a beam reflected from an optical disc;

a first optical sensor that receives two beams of a plurality of the beams split by said beam splitting means and outputs a signal for generating a focus error signal; and a second optical sensor that receives at least one beam of a plurality of the beams split by said beam splitting means and outputs a signal for generating a RF signal;

wherein said beam splitting means is an optical member for splitting the reflected beam into five beams so that the respective split beams are emitted in different directions.

8. An optical head apparatus as claimed in claim 7, wherein said beam splitting means is formed by four prism pieces vertically and horizontally connected with each other, and has an opening in the center thereof.

9. An optical head apparatus as claimed in claim 8, wherein said first optical sensor and said second optical sensor constitute one optical sensor and said second optical sensor is disposed in the middle of said first optical sensor.

10. An optical head apparatus as claimed in claim 9, wherein said second optical sensor receives a part of the reflected beam transmitted from said opening of said beam splitting means.

11. An optical head apparatus comprising:
   a light source;
   an optical member for irradiating a beam emitted from said light source onto an optical disc;
   a beam splitter for polarizing a reflected beam from said optical disc;
   a prism for splitting the reflected beam polarized by said beam splitter into five beams;
   a first optical sensor for receiving two beams of the five beams split by said prism to output a first signal for generating a focus error signal;
   a plurality of operational amplifiers for generating a focus error signal based on the first signal output from said first optical sensor;
   a second optical sensor element for receiving one beam of five beams split by said prism to output a second signal for generating an RF signal;
   an amplifier for generating an RF signal based on the second signal output from said second optical sensor;
   a third optical sensor for receiving two beams of the five beams split by said prism to output a third signal for generating a tracking error signal; and
   a differential amplifier for generating a tracking error signal based on the third signal output from said third optical sensor.

12. An optical head apparatus as claimed in claim 11, wherein said first optical sensor and said second sensor are integrally formed by providing said second optical sensor in the center and providing said first optical sensor on both sides of said second optical sensor in contact.

13. An optical head apparatus as claimed in claim 11, wherein said prism is formed by four prism pieces vertically and horizontally connected with each other, has an opening in the center thereof, splits the reflected beam into four beams by each prism piece so that the respective beams are emitted in different directions, and transmits a part of the reflected beam from said opening.

14. An optical head apparatus as claimed in claim 13, wherein said first optical sensor is formed by four optical sensor elements divided by a vertical line and a horizontal line orthogonal thereto, receives two beams obtained by splitting the reflected beam by two prism pieces provided on upper and lower sides of said prism;
   said second optical sensor receives a part of the reflected beam transmitted from said opening of said prism; and
   said third optical sensor receives two beams obtained by splitting the reflected beam by two prism pieces provided on right and left sides of said prism.

15. An optical head apparatus, for generating an RF signal, a focus error signal and a tracking error signal based on a reflected beam from an optical disc, comprising:
   a beam splitting means for splitting a beam reflected from an optical disc into at least five beams;
   a first optical sensor that receives two beams of a plurality of the beams split by said beam splitting means and outputs a signal for generating a focus error signal;
   a second optical sensor that receives two beams of a plurality of beams split by said beam splitting means and outputs a signal for generating a tracking error signal; and
   a third optical sensor element that receives one beam of a plurality of beams split by said beam splitting means and outputs a signal for generating a RF signal.

16. An optical head apparatus as claimed in claim 15, wherein said beam splitting means is formed by four prism pieces vertically and horizontally connected with each other, has an opening in the center thereof, splits the reflected beam into four beams by each of said prism pieces so that the respective beams are emitted in different directions, and transmits a part of the reflected beam from said opening.

17. An optical head apparatus as claimed in claim 16, wherein said first optical sensor is formed by four optical sensor elements equally divided by a vertical line and a horizontal line orthogonal thereto, receives two beams obtained by splitting the reflected beam by two prism pieces provided on upper and lower sides of said beam splitting means.

18. An optical head apparatus as claimed in claim 16, wherein said second optical sensor is formed by two optical sensor elements provided on both sides of said first optical sensor, and receives two beams obtained by splitting the reflected beam by two prism pieces provided on right and left sides of said beam splitting means.

19. An optical head apparatus as claimed in claim 16, wherein said third optical sensor receives a part of the reflected beam transmitted from said opening of said beam splitting means.

20. An optical head apparatus as claimed in claim 15, wherein said first optical sensor and said third optical sensor are integrally formed by providing said third optical sensor in the center and providing a pair of optical sensor elements which constitute said first optical sensor on both sides of said third optical sensor.

21. An optical head apparatus, for generating an RF signal, a focus error signal and a tracking error signal based on a reflected beam from an optical disc, comprising:
   a beam splitting means for splitting a beam reflected from an optical disc;
   a first optical sensor that receives two beams of a plurality of the beams split by said beam splitting means and outputs a signal for generating a focus error signal; and
   a second optical sensor that receives at least one beam of a plurality of the beams split by said beam splitting means and outputs a signal for generating a RF signal;
   wherein said beam splitting means splits the reflected beam into four beams so that the respective split beams are emitted in different directions; and
   wherein said beam splitting means is formed by four prism pieces vertically and horizontally connected with each other.

22. An optical head apparatus as claimed in claim 21, wherein said first optical sensor is formed by four optical sensor elements equally divided by a vertical line and a horizontal line orthogonal thereto, and receives two beams obtained by splitting the reflected beam by two prism pieces provided on upper and lower sides of said beam splitting means.

23. An optical head apparatus as claimed in claim 21, wherein said second optical sensor receives two beams obtained by splitting the reflected beam by two prism pieces provided on right and left sides of said beam splitting means.

* * * * *